Aug. 15, 1933.　　　S. C. KNEFEL　　　1,922,164
BOILER RETURN AND VACUUM TRAP
Filed July 23, 1932　　　2 Sheets-Sheet 1
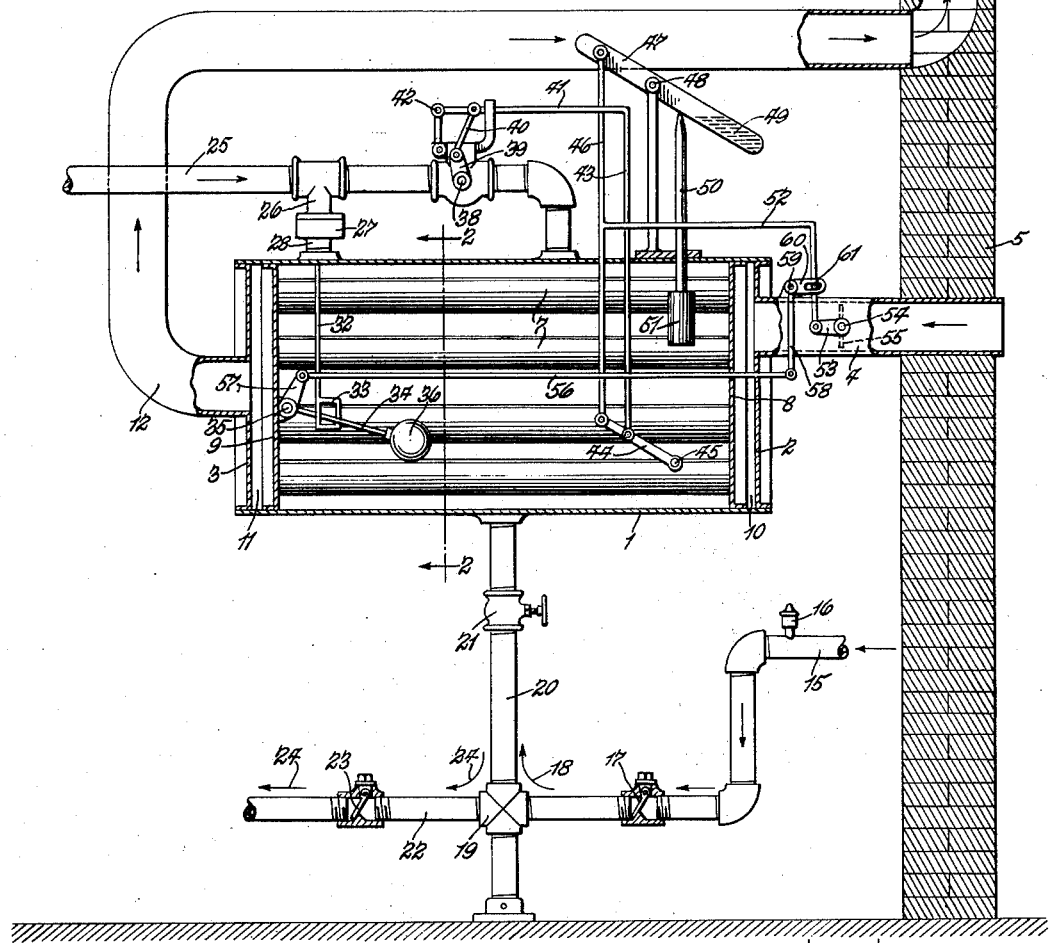
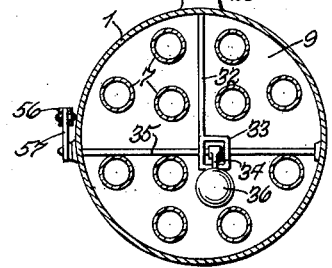

Aug. 15, 1933.  S. C. KNEFEL  1,922,164
BOILER RETURN AND VACUUM TRAP
Filed July 23, 1932   2 Sheets-Sheet 2
Fig. 4.
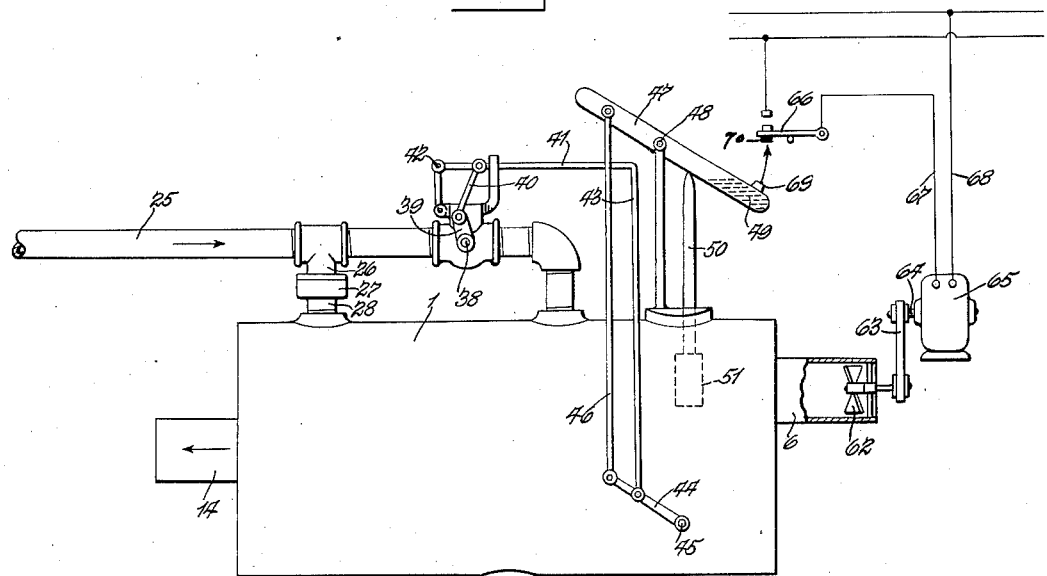
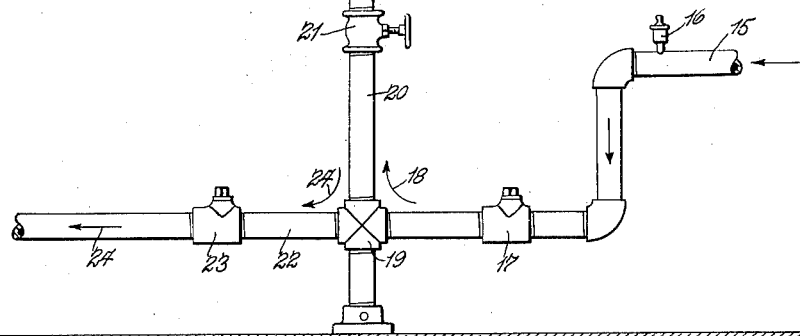
Fig. 5.
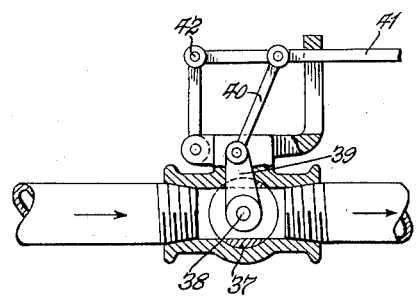
Inventor
Stanley C. Knefel
by Rippey & Kingsland
His Attorneys Patented Aug. 15, 1933

1,922,164

UNITED STATES PATENT OFFICE 1,922,164

BOILER RETURN AND VACUUM TRAP

Stanley C. Knefel, St. Louis, Mo.

Application July 23, 1932. Serial No. 624,173

13 Claims. (Cl. 103—253)

This invention relates to an improved boiler return and vacuum trap for use in connection with steam boilers to control the return to the boiler of water resulting from condensation of steam in the system to which steam is supplied by the boiler.

The present invention relates to that class of inventions constituting the subject matter of my prior Patent No. 1,783,381, granted December 2, 1930, and comprises an improved vacuum trap and equipment therefor controlling passage to the trap of water from the system produced by condensation of steam in the system and for conducting water to the boiler, in combination with improved means for utilizing the steam from the boiler to force the water from the trap, and improved means for condensing the steam in the trap to create a vacuum and thereby cause or permit water from the system to enter the trap; and to repeat these operations automatically and as an incident to the operation of the boiler.

Another object of the invention is to provide an improved trap constituting a unit of the invention for receiving the water from the system produced by condensation of steam, and means for utilizing in the trap steam from the boiler to force the water therefrom, and to provide an improved cooling means for the trap.

Other objects will appear from the following description, reference being made to the annexed drawings, in which—

Fig. 1 is a view showing an embodiment of the invention, together with pipe connections of the system in which the invention is embodied.

Fig. 2 is a vertical cross sectional view of the trap on the line 2—2 of Fig. 1.

Fig. 3 is a detail view of one of the valves controlling the passage of steam into the trap.

Fig. 4 is an elevation of the invention combined with mechanism for forcing cooling currents of air through the trap.

Fig. 5 is a detail sectional view of the valve cooperating with the valve of Fig. 3 to control the passage of steam into the trap.

The outer or condenser tank 1 has a wall 2 at the inlet end and a wall 3 at the outlet end. A pipe 4 may open to the outside through the building wall 5, as shown in Fig. 1. Instead of the pipe 4, I may use a pipe 6 (Fig. 4) that does not extend or open through the building wall but terminates within the building, or these pipes 4 and 6 may be otherwise arranged so as to receive and conduct air into the tank and condenser 1 through the upper portion of the end wall 2. The pipes 4 and 6 open through the upper portion of the end wall 2 of the condenser tank, because these pipes admit cool air into the tank and a portion of the cool air will pass or move downwardly toward the bottom of the tank before passing longitudinally through the pipes or tubes 7.

The pipes or tubes 7 open through partitions 8 and 9 secured within the tank 1, the partition 8 being spaced from the wall 2 to provide a chamber or space 10 and the partition 9 being spaced from the wall 3 to provide a chamber or space 11. Thus the air entering the space 10 through the pipe 4 or the pipe 6 will pass through the pipes or tubes 7 into the space 11 and will be conducted or discharged from said space 11 through a pipe 12 (Fig. 1) opening into an outlet flue 13 or through a pipe 14 (Fig. 4) discharging into the building.

The pipes or tubes 7 are spaced from each other and extend from the wall 8 to the wall 9, so that the air may pass freely from the space or chamber 10 to the space or chamber 11 along and into contact with the outer surfaces of said walls 8 and 9 and along and into contact with the inner surfaces of the pipes or tubes 7 so as to cool and cause condensation of steam confined between the walls 8 and 9. The pipes or tubes 7 are imperforate and, excepting for the openings to said pipes, the walls 8 and 9 are imperforate.

The pipe 15 is a return pipe to the system to which steam is supplied by the boiler and is for the purpose of returning to the boiler the water produced by condensation of the steam in the system. It is considered unnecessary to illustrate the connection of the return pipe with the system for such connection is well known. The pipe 15 is equipped with an air exhaust valve or device 16 of any standard commercial type, the construction and arrangement of which are well known. This valve or device 16 permits air to escape from the pipe 15 without permitting the escape of steam to any substantial extent. The pipe 15 has therein a check valve 17 permitting water to flow in the direction of the arrow 18 and preventing the water from flowing in the opposite direction. The pipe 15 is connected into a fitting 19 from which a pipe 20 extends and opens into the condenser 1 into the space between the walls 8 and 9. The joint formed by the pipe 20 with the condenser wall 1 is impervious, so that there is no leakage through this joint. The pipe 20 is equipped with a manually operated valve 21 of familiar construction, which may be operated and adjusted to open and to close said pipe.

From the fitting 19 a pipe 22 leads to the boiler (not shown) and is connected with the boiler in such a way as to discharge into the boiler water that is returned to the boiler from the system and which is accumulated by condensation of steam in the system. Such a connection of the return pipe with a boiler is familiar and no showing thereof is needed to enable those skilled in the art to understand this invention. The pipe 22 is equipped with a check valve 23 of a familiar type that permits water to flow through the pipe 22 in the direction of the arrows 24, but prevents water from flowing through the valve 23 in the opposite direction.

A pipe 25 is arranged to conduct steam from the boiler, illustration of the connection of this pipe with the boiler being unnecessary. The pipe 25 has a branch 26 opening into a valve housing 27 having a tubular extension 28 opening into the trap. A spherical valve 29 is mounted in the valve housing 27 and is movable to and from a valve seat 30 in order to close and to open communication from the valve housing 27 to the tube 28. Spring arms 31 of curved formation are attached to the wall of the housing 27 and will wholly or partially support the valve 29 in its raised or open position and will yieldingly retain said valve in its lower or closed position, as will be understood by reference to Fig. 3 of the drawings. A link 32 connected with the valve 29 extends downwardly through the tubular extension 28 into the trap and at its lower end has a connection 33 engaging a lever 34 having one end supported by a pivot 35 and the opposite end supporting a float 36, which constitutes an actuator operated by water or condensed steam in the trap to swing the lever 34 upwardly and thereby move the link 32 upwardly as required to move the valve 29 to open position. This operation of the float actuator 36 by the water in the trap is sufficient to move the valve 29 from its seat and to overcome the resistance of the springs 31. The weight of the float actuator 36 assisted by steam pressure above the valve 29 is sufficient to overcome the resistance of the springs 31 and to move the valve 29 to closed position when the water in the trap is lowered to permit such operation.

A rock valve device 37 is mounted in the pipe 25 beyond the connection of said pipe with the branch pipe 26 and is operated by rocking movements to open and to close said pipe 25. These rocking valves are of familiar construction and I prefer to use a well known form thereof. This valve has a stem 38 to which is attached a lever 39 connected by a link 40 with a lever member 41 that is pivoted on a support 42. Beyond its connection with the link 40, the lever 41 is formed with an angular extension 43 having its lower end pivoted to a lever 44 pivoted on a support 45. The end of the lever 44 is pivoted to the lower end of a link 46 having its upper end pivoted to a lever device 47 mounted on a pivot support 48. The lever device 47 may be hollow and include a liquid weight 49, such as mercury, that will flow to and from the end of said lever to assist in actuating the lever. A longitudinally movable member 50 of a thermostatic device 51 engages the lever member 47 beyond the pivot 48, the arrangement being such that the pivot 48 is between the link 46 and the member 50. The thermostatic device 51 is supported within the condenser 1 in any appropriate manner and is constructed in a familiar way so as to move the member 50 outwardly when heated beyond a predetermined degree of heat and to move the member 50 inwardly when the temperature is reduced below a predetermined degree. Thus the thermostatic device 51 is a familiar element for moving the part 50 outwardly when heated and inwardly when cooled. Thermostatic devices for imparting such movement to members to be controlled thereby are quite well known and no specific illustration of the device is required.

An arm 52 is attached to the link 46 and extends to pivotal connection with one end of a lever 53, the opposite end of said lever 53 being attached to the stem 54 of a butterfly valve 55 within the pipe 4. Thus the valve 55 is opened when the lever member 47 is operated by outward movement of the member 50 actuated by heating of the thermostatic device 51.

A link 56 has one end pivoted to a lever 57 attached to the rocker pivot 35, which is operated by the float actuator device 36. The opposite end of the link 56 is pivoted to one end of the lever 58, the opposite end of which is connected with a pivot 59 attached to an arm 60 having pin and slot connection 61 with the arm 52. Thus the device 36 cooperates with the lever member 47 to open and to close the valve 55.

In the variation of the invention shown in Fig. 4, a blower 62 is located in or adjacent to the open end of the pipe 6 and is operated by a driving connection 63 with the shaft 64 of the motor 65.

The electric circuit to the motor 65 is opened and closed by a switch device 66. The switch device 66 is in open position and the electric circuit to the motor through the wires 67 and 68 is open when the thermostatic device 51 is cool and the member 52 is in its downward or retracted position, which leaves the lever 47 inclined. When the thermostatic device 51 is operated by the heat to move the member 50 outwardly and thereby operate the lever member 47, the switch device 66 is closed by engagement of a part 69 on the lever member 47 with an insulating part 70 on the switch member 66. The switch member 66 is thereby moved to closed position, closing the circuit through the wires 67 and 68 to the motor 65 and causing said motor 65 to operate the blower 62 and force a cooling supply of air through the condenser in order to cool and condense the steam and cool the thermostatic device 51.

The remaining construction shown in Fig. 4 of the drawings is the same as that already described and specifically illustrated in Fig. 1 and like reference numerals are applied to like parts.

The construction and arrangement of this invention may be varied otherwise than in the specific particulars indicated in order to adapt the invention to its intended uses and purposes. I do not restrict myself in any unessential particulars, but what I claim and desire to secure by Letters Patent is:

1. A device of the character described comprising a combined condenser and vacuum trap, means for admitting water into said condenser and trap, a pipe for admitting steam into said condenser and trap, tubes extending through said condenser and trap, a valve for opening and closing said pipe, an actuator in said condenser and trap controlled by the water therein for opening and closing said pipe, and means other than said actuator controlling passage of air through said tubes.

2. A device of the character described comprising a combined condenser and vacuum trap, means for admitting water into and voiding said water from said condenser and trap, pipes for alternately admitting steam into said condenser and trap, tubes extending through said condenser and trap, means for causing air to pass through said tubes, valves for opening and closing said pipes, and automatic means operated respectively by water and by variations of temperature in said condenser and trap for opening said valves respectively to admit steam to the trap when the trap becomes charged with and voided of water.

3. A device of the character described comprising a combined condenser and vacuum trap, means for admitting water into said condenser and trap, a pipe for admitting steam into said condenser and trap, tubes extending through said condenser and trap, means for causing air to pass through said tubes, a valve for opening and closing said pipe, and automatic means for opening said valve during the time that said first means is unoperated to admit steam to the trap when the trap becomes filled with water.

4. A device of the character described comprising walls forming an enclosure constituting a combined condenser and vacuum trap, means for admitting water into said enclosure, a pipe having two openings for admitting steam into said enclosure, tubes extending through said enclosure, means for causing air to pass through said tubes, a valve for opening and closing each of said openings to said enclosure from said pipe, and automatic means for opening and closing said valves alternately to admit steam to said enclosure when the enclosure contains a predetermined amount of water and to operate said first-named means respectively.

5. A device of the character described comprising walls forming an enclosure constituting a combined condenser and vacuum trap, means for admitting water into said enclosure, a pipe having two openings for admitting steam into said enclosure, tubes extending through said enclosure, means for causing air to pass through said tubes, a valve for opening and closing each of said openings to said enclosure from said pipe, automatic means controlled by the water entering said enclosure for opening and closing one of said valves, and automatic means controlled by variations of temperature for opening and closing the other valve.

6. A device of the character described comprising walls forming an enclosure constituting a combined condenser and vacuum trap, means for admitting water into said enclosure, means forming passages for admitting steam into said enclosure, a valve for opening and closing each of said passages, means controlled by the water in said enclosure for opening and closing one of said valves, and means controlled by variations of temperature in said enclosure for opening and closing the other valve.

7. A device of the character described comprising walls forming an enclosure constituting a combined condenser and vacuum trap, a pipe for conducting water into and from said enclosure, valves for causing water to pass in one direction through said pipe into said enclosure and in the opposite direction through said pipe from said enclosure, a pipe for admitting steam into said enclosure to force the water therefrom, a device in said enclosure controlled by the water therein for opening and closing said last named pipe, tubes for conducting air through said enclosure, and means operated other than by said device controlling passage of air into said tubes.

8. A device of the character described comprising walls forming an enclosure constituting a combined condenser and vacuum trap, means for admitting water into and conducting said water from said enclosure, a steam pipe having two openings into said enclosure, means operated by the water in said enclosure controlling one of said openings, thermostatic means operated by the changes of temperature in said enclosure controlling the opening and closing of the other one of said openings, and means for varying the temperature in said enclosure.

9. A device of the character described comprising walls forming an enclosure constituting a combined condenser and vacuum trap, means for admitting water into and conducting said water from said enclosure, a steam pipe having two openings into said enclosure, means operated by the water in said enclosure controlling one of said openings, thermostatic means operated by the changes of temperature in said enclosure controlling the opening and closing of the other one of said openings, tubes extending through said enclosure, means forming chambers beyond the end walls of said enclosure, means for admitting air into one of said chambers, and means for conducting the air discharged into the other chamber from said tubes.

10. A device of the character described comprising walls forming an enclosure constituting a combined condenser and vacuum trap, means for admitting water into and conducting said water from said enclosure, a steam pipe having two openings into said enclosure, means operated by the water in said enclosure controlling one of said openings, thermostatic means operated by the changes of temperature in said enclosure controlling the opening and closing of the other one of said openings, tubes extending through said enclosure, means forming chambers beyond the end walls of said enclosure, means for admitting air into one of said chambers, means for conducting the air discharged into the other chamber from said tubes, and mechanism controlled by said thermostatic means controlling passage of air into said first chamber and through said tubes.

11. A device of the character described comprising walls forming an enclosure constituting a combined condenser and vacuum trap, means for admitting water into said enclosure, a pipe for admitting steam into said enclosure, a valve for opening and closing said pipe, automatic means for opening said valve to admit steam into said enclosure when said enclosure contains a predetermined amount of water, and mechanism controlled other than by said automatic means for forcing circulation of air through said enclosure.

12. A device of the character described comprising walls forming an enclosure for receiving water and steam, a return water pipe for admitting water into and conducting water from said enclosure, a steam pipe having two openings into said enclosure, a valve controlled by the water in said enclosure for opening and closing one of said openings, a valve for opening and closing the other opening, a thermostatic device for opening and closing said second valve, and means for cooling said enclosure and said thermostatic device and causing said thermostatic device to open said second valve.

13. A device of the character described comprising walls forming an enclosure constituting a combined condenser and vacuum trap, a thermostatic device subjected to the temperature in said enclosure, means operated by said thermostatic device controlling the alternate admission of water and steam into said enclosure, tubes extending through said enclosure, mechanism controlled by said thermostatic device for forcing air through said tubes, and means other than said thermostatic device controlling admission of steam into said enclosure to eject water therefrom.

STANLEY C. KNEFEL.